June 1, 1965

I. EPSTEIN 3,186,152

ROTARY MOWER

Filed Oct. 1, 1963

INVENTOR.
ISIDORE EPSTEIN

BY his ATTORNEYS

June 1, 1965   I. EPSTEIN   3,186,152
ROTARY MOWER
Filed Oct. 1, 1963   3 Sheets-Sheet 3

INVENTOR.
ISIDORE EPSTEIN
BY
his ATTORNEYS

United States Patent Office 3,186,152
Patented June 1, 1965

3,186,152
ROTARY MOWER
Isidore Epstein, New Hyde Park, N.Y., assignor to G. W. Davis Corporation, Richmond, Ind., a corporation of Indiana
Filed Oct. 1, 1963, Ser. No. 312,923
2 Claims. (Cl. 56—202)

This invention relates in general to rotary mowers and more particularly to improvements in means for drawing material into a rotary mower and improvements in means for collecting material discharged from a rotary mower.

Specifically, this device discloses a rotary mower having a blade casing with an exiting area to the rear of the casing and a platform for holding a grass or discharge collector, integral with the casing positioned to the rear of its exiting area. This collector is generally box-shaped and may be placed on the platform. It has an opening on its side surface opposite the rear exiting area of the blade casing and the entire collector is movable into or out of its position on the platform.

Between the exiting area of the blade and the opening in the grass collector there is a shielding plate having an aperture which may be closed or open by adjustable shutter means. When the shutter is in the closed position, the material being cut within the blade casing cannot pass into the grass collector or on to the platform to the rear of the rotary mower if the grass collector is not in position. The shutter means is designed so that when it is open it will lock open by the grass collector in place when the collector is positioned upon the rearwardly disposed platform. Thus, although the shutter may be open or closed with the grass collector in position, the shutter will always be closed when the grass collector is out of position and being emptied by the operator. This is a safety feature not heretofore provided by the prior art, a feature which permits the operator to empty the catcher quickly and efficiently. Until now, it has been necessary to stop the mower before the operator could safely empty the grass catcher.

In rotary mowers developed prior to this invention, the exiting area or discharge area of the blade casing was always placed in a forward position or on the side of the mower. This was necessary for the convenience of the operator so that the debris from the rotary mower would not be cast into his path. Numerous catchers were developed which attached to these forward or side exiting areas of the mower, and were generally cumbersome bag arrangements which constantly impeded the mower's efficiency and usefulness by presenting too wide a profile for many yard areas. The tandem arrangement disclosed in this invention presents a narrow profile and thus permits access to many confined or narrow areas. Furthermore, the collector disclosed herein may be a metal basket which may be as wide as the mower itself, thus permitting far more efficient packing possibilities and reducing the number of times that the user must empty the catcher.

The flexible bags used in the prior art devices have proved to be extremely undesirable especially when the user attempted to move the rotary in a rearward direction or to back out of a narrow enclosure. In these cases, the bags have been sometimes caught and destroyed under the wheels of the rotary. The collector disclosed in the present invention is fixed in a position, so that it is virtually impossible for it to be caught within the wheels of the rotary or destroyed by the blade whether the mower is being moved forward, backward, or being turned.

This invention further discloses means for cutting grass or a material growing adjacent a vertical structure. This improvement comprises a projection on the side surface of the mower, which projection has an elongated generally vertical opening on its forward surface. The wheels of the rotary mower are positioned so as to permit this vertical elongated opening in the blade casing to be moved close to any vertical structure. The grass or material growing adjacent this vertical structure is sucked within the elongated opening in the blade casing by the vacuum created by the rotating blade, whereupon the material is instantly cut.

This edging feature as disclosed in this invention overcomes one of the main disadvantages of mowers in general in that they are unable to cut grass growing adjacent a vertical structure. This device now gives the rotary mower this capability and constitutes a distinct advancement in the art.

A further feature disclosed by this invention is a system for mounting wheels whereby the user may set each wheel at exactly the same setting with respect to a forward reference point. Heretofore, the height of the rotary mower has always been adjusted by moving each wheel to a prescribed setting. In these systems, however, the front wheels are moved to a specific setting with respect to a forward reference point whereas the rear wheels are moved to the same setting with respect to a rear reference point. This setting, however, is different with respect to the corresponding forward reference point on each of the rear wheels. Thus there is the danger that the user may mis-set the two sets of wheels causing a variance in height and the cutting plane of the rotary mower, which could possibly result in uneven cutting of the lawn. To overcome this disadvantage, the wheel assemblies disclosed in this invention are moved to exactly the same height setting by movement to the same reference position in each wheel assembly.

This invention has the further advantage of improving the maneuverability of a rotary mower. The turning problem has been eased by the placing of the handle of the mower to the rear of the coaxial rear wheels which act as a fulcrum during turning. Thus the operator receives an added mechanical advantage during a turning maneuver to offset the weight of the heavy motor section by virtue of the spacing between the fulcrum and attachment point of the handle.

Other advantages and a fuller understanding of this invention may be had by referring to the following description and claims taken in conjunction with the accompanying drawing in which:

FIGURE 5 shows a partial isometric view of a side of the blade casing having the edger projection.

Figure 1:
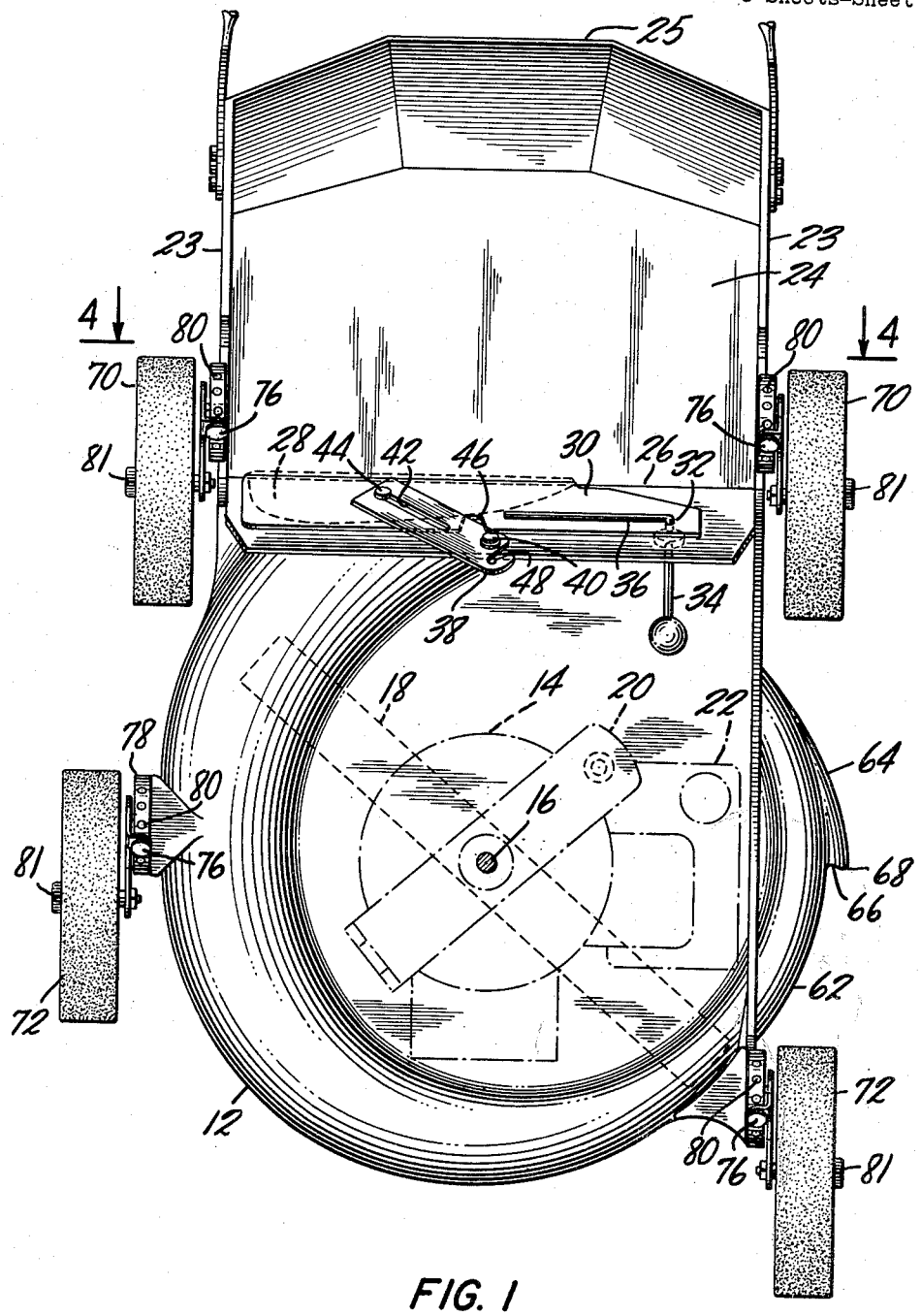
FIGURE 1 shows a plan view of the rotary mower without the collector.
Figure 2:
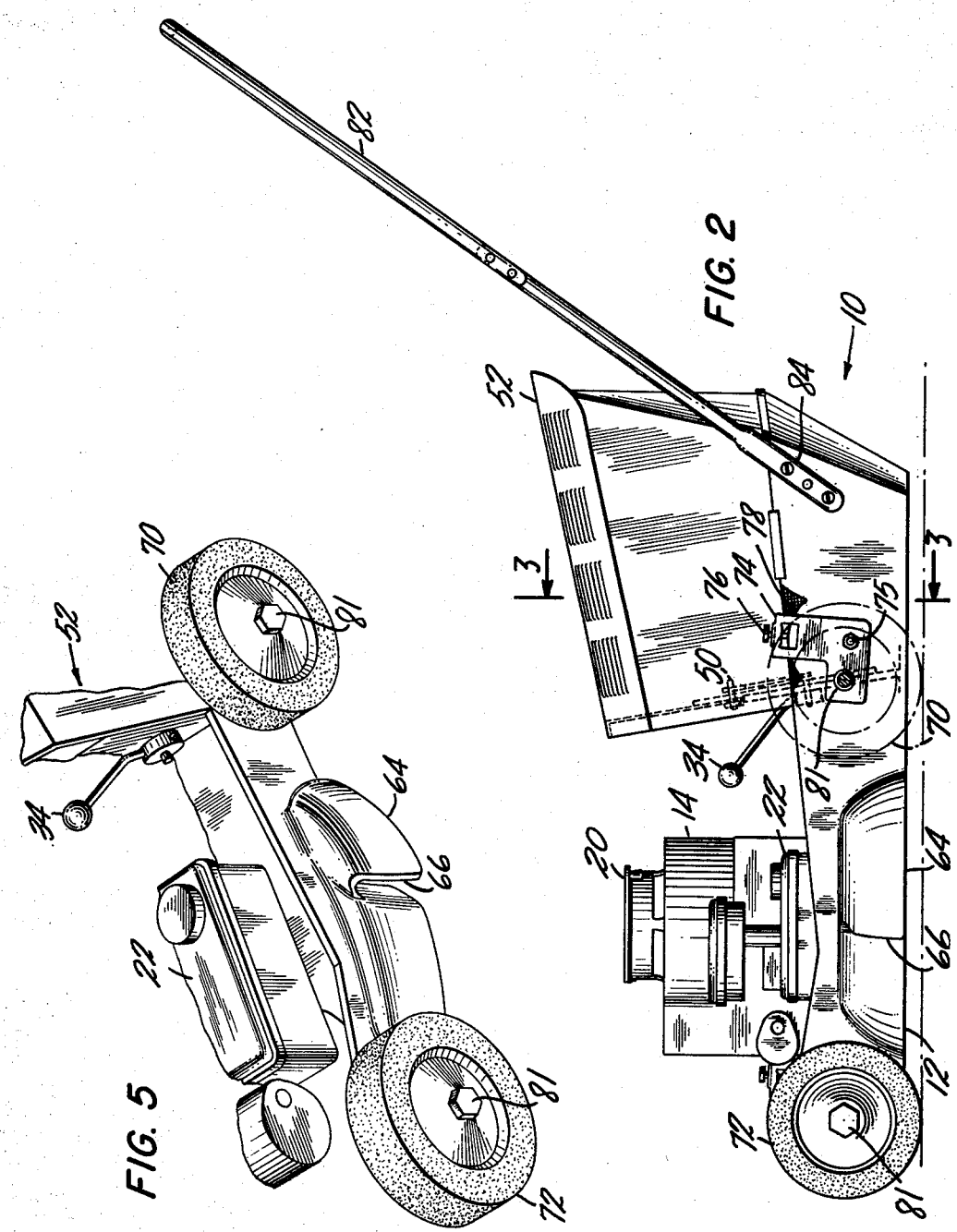
FIGURE 2 shows an elevational view of the rotary mower with the collector properly positioned behind the exiting area of the blade casing.

With reference to the drawing, the invention is illustrated as being incorporated in the rotary mower indicated generally by the reference character 10. As illustrated in FIGURES 1 and 2, the rotary mower comprises a blade casing 12 having a volute shape upon which is mounted conventional motor means 14 which is connected through central shaft 16 to the rotary blade 18 positioned below within the casing. A conventional starter 20 is shown positioned on motor 14 and a fuel tank 22 stores gasoline for use in the motor.

A rear platform 24 is positioned to the rear of volute casing 12 and is shown clearly in FIGURE 2 as being fabricated integrally therewith. The platform 24 has a generally horizontal base to which side walls 23 and inclined rear wall 25 are attached. The forward edge of the platform has a front wall 26 which tilts forwardly and upwardly, generally away from the operator who would be pushing the mower. Plate 26 has an aperture 28 which connects directly with the chamber within blade casing 12 and forms the exiting area therein.

A shutter 30 is pivotally mounted at pivot point 32 and moves within a plane directly adjacent to tilted forward plate 26. The shutter 30 may be rotated about pivot point 32 by rotating handle 34 which passes through pivot point 32 in forward tilted wall 26 and is attached firmly to shutter 30 along rod 36.

A locking plate 38 is also attached to forwardly tilted plate 26 by fastener 40. This locking plate has an elongated slot 42 in which guide 44, which is firmly attached to shutter 30, moves. The shutter 30 also has a notch 46 to permit clearance of fastener 40 which is holding locking plate 38 in a rotatable position adjacent forwardly tilted plate 26. Locking plate 38 also has a notch 48 in one end, generally adjacent pivot point 40, which notch is designed to receive and hold stud 50 which projects from the inner surface of a grass collector 52.

The collector 52 is shown in the preferred embodiment as a generally box-shaped container having a solid metal upper portion 54 composed of four side walls and a cover in which are found a plurality of vents 56. The upper portion 54 of the collector 52 is attached firmly to a lower portion 58 which is generally a wire basket, shaped with an open upper surface and an open forward side area 61.

The stud 50 is fastened adjacent the lower edge of a solid forward wall 60 below which is located the opening 61 in the side wall of the basket area 58. Thus, in general, the collector 52 is generally box-shaped with an opening in the lower half of its forward surface.

The grass collector is designed to fit within platform 24 with its open area adjacent the tilted forward plate 26 and opposite the discharge aperture 28 of the blade casing 12. In the preferred embodiment the basket section 58 fits totally within the side walls of platform 24 so that the solid upper section 54 of the collector 52 forms generally a continuous surface with the side walls 23 and rear wall 25 of platform 24.

In operation, the motor 14, after being started by starter 20, causes the blade 18 to rotate clockwise within casing 12 as shown in FIGURE 1. The blade 18 cuts the grass or leaves or other substance in its path and the debris is swept up within the volute channel within blade casing 12, being swept around toward exit aperture 28.

Figure 3:
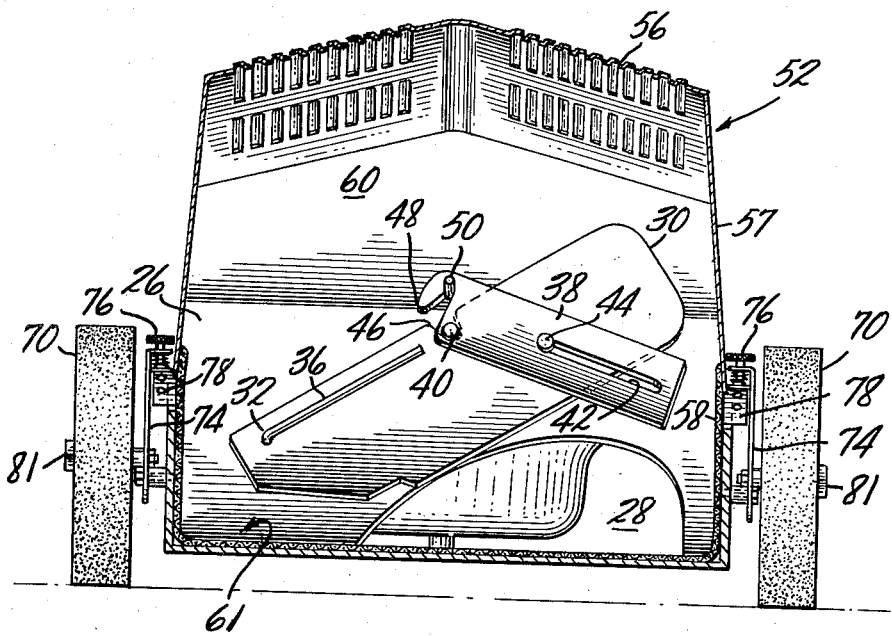
FIGURE 3 shows a cross-sectional end view of the rotary mower taken along the lines 3—3 in FIGURE 2 with the shutter in an open position.

For the purposes of explaining the operation of this invention we will assume that the grass collector 52 is locked in place on platform 24 and that the shutter 30 is in the open position as shown in FIGURE 3 with notch 48 of locking plate 38 engaging stud 50 on the inner cover of the collector 52. Positioned in this manner the debris from blade casing 12 is free to flow through aperture 28 into the collector 52. The air passing through with the debris leaves the collector 52 through the vents 56 on its upper surface, although the debris is retained.

Figure 4:
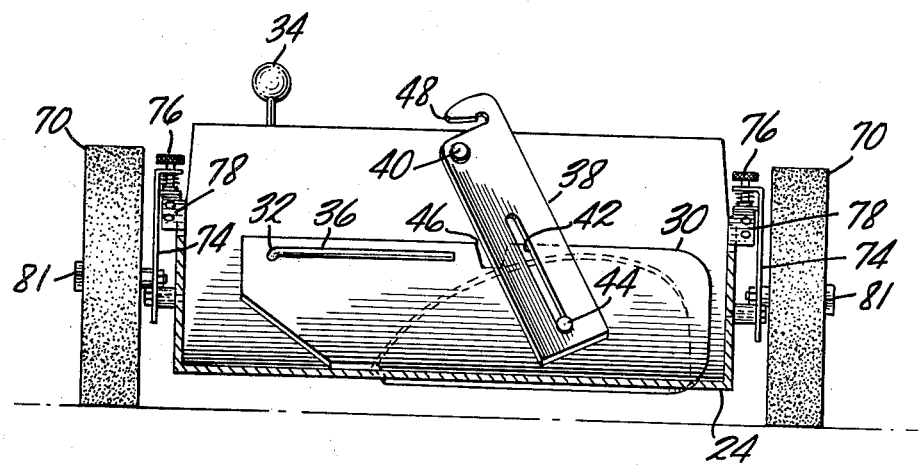
FIGURE 4 shows a cross-sectional end view taken along the lines 4—4 in FIGURE 1 with the shutter in a closed position.

The operator may continue to use the mower until the chamber within collector 52 is filled with debris at which point he merely has to rotate handle 34 upwardly in a counterclockwise direction. This rotates rod 36 and, in turn, shutter 30 downwardly. Pivoting stud 44, being firmly attached to shutter 30, also rotates about pivot 32 and begins to slide downwardly within slot 42. This causes locking plate 38 to rotate about pivot 40. Likewise, slot 48 rotates about pivot 40 until the shutter occupies its closed position as shown in FIGURE 4 and stud 50 on the inner surface of collector 52 is free. At this point the operator is free to lift the collector 52 with its basket 58 out of platform 24 and to discard the contents through the opening 61 on its lower forward surface.

It should be emphasized that during this entire process the motor 14 continues to turn blade 18 and that it is not necessary for the operator to turn off the mower as has been heretofore required in the devices presently known. This is a swift, simple and safe operation with the operator being relieved of the requirement of restarting the motor 14 and reclamping a grass catcher onto the mower.

When the operator has emptied the contents of collector 52 he merely places the collector back onto platform 24 and into its operating position as shown in FIGURE 2. With the motor still running he then merely rotates handle 34 downwardly in a clockwise direction forcing bar 36 and shutter 30 to rotate upwardly, causing pivot stud 44 to move upwardly in slot 32, and causing locking plate 38 to rotate counterclockwise around pivot 44 until stud 50 is firmly locked within notch 48. At this point the shutter 38 will be in the open position shown in FIGURE 3, thereby allowing debris to flow freely from blade casing 12 through aperture 28 and into the collector.

On side 62 of blade casing 12 a projection 64 extends beyond the normal contours of the side, forming an elongated vertical aperture 66 generally on the forward side of the projected area 64, as shown in FIGURE 5. In the preferred embodiment a leading edge 68 extends slightly forwardly of elongated slot 66 and is designed to guide grass and material into the slot. The slot 66 may be used as an edger for cutting high grass adjacent a vertical structure which otherwise could not be reached by the blades of the mower. The vacuum created within the blade casing 12 actually draws the grass within aperture 66 as it moves adjacent the vertical structure. In this way a means for cutting vegitation close to its roots is provided and the operator is relieved of the task of cutting these different areas by hand.

Also attached to platform 24 are rear wheels 70 which are aligned generally along the same axis. These wheels operate in conjunction with staggered front wheels 72 to support the entire rotary mower. The wheels are attached to platform 24 or casing 12 by pivot 75. The bracket 74 has a pin 76 which is designed to enter one of the apertures 80 in arc slot 78 which is fastened to the casing or the platform. By moving pin 76 to a different aperture in the perforated arc plates 78, the height of the central shaft 81 of wheels 70 or 72 may be adjusted in the conventional manner.

The adjustment of the wheels in the instant invention is unique in that the pivot point 75 for all of the wheels is placed to the rear of shaft 81. This permits a uniform adjustment of each wheel so that the operator will no longer be confused by having to adjust the front wheels, say, two slots from the front and the rear wheels three slots from the front. In the arrangement of the wheel assemblies shown in the present invention, all four wheels would be adjusted two slots from the front edge of perforated arc 78, if this is the desirable height.

Finally, the directional control of the rotary mower disclosed in this invention has been greatly eased by attaching the handle to the rear of the axis 81 of the aligned rear wheels 70. As shown in FIGURE 2, handle 82 is fastened to the side walls 23 of platform 24 by fasteners 84. The distance between shafts 81 and the fastening elements 84 gives the operator an additional mechanical advantage when he bears down on handle 82 in an effort to lift front wheels 72 from the ground when he desires to change the direction of the rotary mower. This increase in the operator's mechanical advantage is an improvement in maneuverability over the rotary mowers presently known.

Although the invention has been described with a certain degree of particularity, it is understood that the present disclosure has been made only by way of example and that numerous changes in the details of construction and a combination and arrangement of parts may be resorted

I claim:
1. A blade casing having an exiting area, a removable collector including a side surface, said side surface being provided with an opening therein, means attached to said casing for supporting said collector, said collector normally being supported on said supporting means with said side surface opening opposite said exiting area of said blade casing, an adjustable shutter attached to said casing movable between a position opening said exiting area and a position closing said exiting area when said collector is supported on said supporting means, and locking means on said collector for holding said collector on said supporting means when said shutter means is in a position opening said exiting area, said locking means permitting the removal of said collector from said supporting means when said shutter means is in the position closing said exiting area of said blade casing.

2. A blade casing having an exiting area, a removable collector including a side surface, said side surface being provided with an opening therein, means attached to said casing for supporting said collector, said collector normally being supported on supporting means with said side surface opening opposite said exiting area of said blade casing, and an adjustable shutter attached to said casing movable between a position opening said exiting area and a position closing said exiting area of said blade casing when said collector is supported on said supporting means whereby the exiting area of said blade casing may be closed prior to the collector's removal from said supporting means.

References Cited by the Examiner
UNITED STATES PATENTS

| | | | |
|---|---|---|---|
| 2,568,045 | 9/51 | Weisert | 56—202 |
| 2,719,396 | 10/55 | Morris et al. | 56—25.4 |
| 2,734,327 | 2/56 | Whitney | 56—295 |
| 2,836,430 | 5/58 | Langenbacher | 280—43 |
| 2,848,859 | 8/58 | Abel | 56—25.4 |
| 2,882,063 | 4/59 | Strasel | 280—43 |
| 2,882,668 | 4/59 | Murillo | 56—25.4 |
| 2,917,890 | 12/59 | Thomas | 56—25.4 |
| 2,983,095 | 5/61 | Barth | 56—202 |
| 3,085,386 | 4/63 | Slemmons | 56—25.4 |
| 3,132,457 | 5/64 | Slemmons | 56—202 |

T. GRAHAM CRAVER, *Primary Examiner.*

ANTONIO F. GUIDA, *Examiner.*